United States Patent [19]
Miller et al.

[11] Patent Number: 5,532,019
[45] Date of Patent: Jul. 2, 1996

[54] PROCESS FOR MAKING STABLE EMULSIFIED DRESSINGS WITH POLYOL FATTY ACID POLYESTERS

[75] Inventors: Mark S. Miller, Arlington Heights; Kevin J. Surber, Lombard, both of Ill.

[73] Assignee: Kraft Foods, Inc., Northfield, Ill.

[21] Appl. No.: 466,993

[22] Filed: Jun. 5, 1995

[51] Int. Cl.$^6$ .................................................. A23L 1/24
[52] U.S. Cl. ........................ 426/589; 426/601; 426/605; 426/611; 426/613
[58] Field of Search .................................. 426/589, 601, 426/602, 611, 613

[56] References Cited

U.S. PATENT DOCUMENTS

| | | | |
|---|---|---|---|
| 3,597,417 | 3/1971 | Myhre | 260/234 |
| 3,600,186 | 8/1971 | Mattson et al. | 426/804 |
| 3,764,346 | 10/1973 | Noznick et al. | 426/570 |
| 4,897,474 | 1/1990 | Bickert | 536/119 |
| 4,923,707 | 5/1990 | Schoenberg | 426/602 |
| 5,158,798 | 10/1992 | Fung et al. | 426/602 |
| 5,192,569 | 3/1993 | McGinley et al. | 426/96 |
| 5,356,644 | 10/1994 | Hendrick et al. | 426/99 |

FOREIGN PATENT DOCUMENTS

| | | |
|---|---|---|
| 54980/90 | 11/1990 | Australia . |
| 0062565 | 10/1982 | European Pat. Off. . |
| 0252250 | 1/1988 | European Pat. Off. . |
| 0311154 | 12/1989 | European Pat. Off. . |
| 0375239A2 | 6/1990 | European Pat. Off. . |
| WO92/00947 | 1/1992 | WIPO . |

OTHER PUBLICATIONS

Bailey, "Bailey's Industrial Oil & at Products", 1964, pp. 958–972.

*Primary Examiner*—Jeanette Hunter
*Attorney, Agent, or Firm*—Fitch, Even, Tabin & Flannery

[57] ABSTRACT

A method of making stable, low-calorie emulsion-type dressings wherein the triglyceride oil is replaced wholly or partially with an edible, wholly or partially nondigestible, low-calorie polyol fatty acid polyester is provided. A preemulsion containing at least a portion of the polyol fatty acid polyester, preferably sucrose fatty acid polyester, is prepared in a thickened gum solution. The preemulsion is then combined with the remaining ingredients. Stable mayonnaise-type products can be prepared containing about 40 to 60 weight percent polyol fatty acid polyesters. By incorporating a starch, viscous salad dressings containing about 12 to 50 weight percent polyol fatty acid polyesters can be prepared. The mayonnaise-type products can be used as a base for pourable salad dressings containing about 12 to 50 weight percent polyol fatty acid polyesters.

23 Claims, No Drawings

PROCESS FOR MAKING STABLE EMULSIFIED DRESSINGS WITH POLYOL FATTY ACID POLYESTERS

FIELD OF THE INVENTION

The present invention relates generally to a method for the manufacture of viscous and pourable dressings having a reduced oil and calorie content. More particularly, the present invention is directed to a method of making stable emulsion-type dressings wherein the triglyceride oil is replaced wholly or partially with an edible, wholly or partially nondigestible, low-calorie polyol fatty acid polyester.

BACKGROUND OF THE INVENTION

Mayonnaise is a well recognized oil-in-water emulsion. The manufacture of mayonnaise in the United States is controlled by the Food and Drug Administration (FDA) Standards of Identity. Mayonnaise is the emulsified semi-solid, non-pourable, oil-in-water emulsion prepared from vegetable oil, water, egg yolk-containing material, and acidifying ingredient. To be called a mayonnaise product in accordance with the FDA Standards of Identity, the emulsified dressing must be emulsified with egg yolk as the sole emulsifier and must contain at least 65 weight percent vegetable oil.

In the basic method for the production of mayonnaise, the required ingredients are assembled and premixed in a container. The resulting mixture is transferred to an emulsifying apparatus such as a colloid mill. A colloid mill provides relatively high shear forces which finely divides the mixed ingredients and forms a highly viscous oil-in-water emulsion. High viscosity is a desirable quality because it produces a high level of stability.

In a typical mayonnaise emulsion, the high viscosity is a result of tightly packing the globules of the dispersed phase (i.e., oil globules) in the continuous water phase. This is relatively easy to accomplish when the percentage of oil is greater than 74 weight percent. Thus most commercial mayonnaise products typically have oil contents much higher than the legal minimum 65 weight percent (i.e., an oil level greater than about 74 weight percent). It is generally difficult to reduce the oil level of such a mayonnaise product to below about 74 weight percent and still achieve a stable oil-in-water emulsion. Numerous approaches for preparing such low oil-level mayonnaise type products have been used. For example, Schoenberg, U.S. Pat. No. 4,923,707, describes a method for producing a mayonnaise wherein the oil content can be reduced to levels of about 65 to 72 percent using a corn syrup with a low DE of about 27 to 43 in the mayonnaise formulation.

It has been recognized for some time that oil-in-water emulsions having oil contents less than 65 weight percent could be produced with greater stability using a starch base. The term "salad dressing" refers to such starch-containing emulsions. Salad dressing, as generally defined in the FDA Standards of Identity, is an emulsified semi-solid, non-pourable oil-in-water emulsion prepared from an edible vegetable oil, an acidifying ingredient selected from vinegar, lemon juice, and lime juice, an egg yolk-containing ingredient, and a cooked or partially cooked starch paste prepared from food starch, tapioca flour, wheat flour, rye flour, or mixtures of these starchy materials and water. Salad dressing may also contain optional thickening agents (in addition to the egg yolk) such as, for example, gum acacia, carob bean gum, guar gum, gum karaya, gum tragacanth, carrageenan, pectin, xanthan, propylene glycol alginate, sodium carboxymethyl cellulose, and mixtures thereof. Salad dressing, as defined by the FDA Standards of Identity, contains at least 30 weight percent by weight of vegetable oil and sufficient egg-yolk containing ingredient to provide egg yolk solids equivalent to that provided by liquid egg yolk at a least 4 weight percent by weight.

While salad dressing products are useful to those wishing or needing to restrict their intake of calories, such products still contain significant levels of calories and oil. Thus, it would be desirable to further reduce the level of vegetable oil in such products, while at the same time maintaining the desired consistency, and texture. One approach for preparing such low-calorie mayonnaise and salad dressing has been to use polyol fatty acid polyesters, which are well known fat substitutes, in place of the normal triglyceride oils. For example, Mattson et al., U.S. Pat. No. 3,600,186, discloses low-calorie food compositions, including mayonnaise and salad dressing products, wherein at least a portion of the fat is replaced with certain nonabsorbable, nondigestible polyol fatty acid polyesters. These polyol fatty acid polyesters are typically formed by esterifying sugars or sugar alcohols having from 4 to 8 hydroxy groups with fatty acids having from 8 to 22 carbon atoms. At least four of these hydroxy groups are esterified with the fatty acids in order to make the resulting sugar or sugar alcohol fatty acid polyesters nonabsorbable and nondigestible. More recently, European Patent Publication 0 375 239 A2 (Jun. 27, 1990), described emulsified oil dressing products containing blends of polyol fatty acid polyesters and triglyceride oil.

In both these references (Mattson et al. and the European publication), the emulsified oil dressings were prepared using conventional mayonnaise-and salad dressing-making techniques wherein the polyol fatty acid polyesters was simply and directly substituted for the triglyceride oil used in conventional dressing products. But such methods (i.e., a direct substitution of the polyol fatty acid polyester for the triglyceride oil) tend to produce unstable emulsion products. Such direct substitution generally produces an unstable oil-in-water emulsion which tends, upon storage, to invert to an oil-continuous emulsion or to separate into oil and water phases. Such unstable emulsions would clearly not be acceptable commercially. In some case, such a direct substitution using conventional processing techniques does not even produce the desired initial oil-in-water emulsion.

It would be desirable therefore to provide a method of making polyol fatty acid polyester-containing mayonnaise and salad dressing products which have reduced calorie content, good flavor, consistency, and mouthfeel, and which are stable. The present invention provides such a method. In one embodiment of the present invention, a method is provided for producing stable mayonnaise-type, semi-solid dressings utilizing polyol fatty acid polyesters as the fat component. In another embodiment of the present invention, a method is provided for producing stable semi-solid salad dressing type products which have a starch base associated with salad dressing, but which have polyol fatty acid polyesters as the fat component. In still another embodiment of the present invention, a method is provided for producing stable pourable dressings utilizing polyol fatty acid polyesters as the fat component. The polyol fatty acid polyester-containing emulsified dressings prepared by the method of this invention are stable (i.e., the oil-in-water emulsion has a significantly reduced tendency to invert or to phase separate).

SUMMARY OF THE INVENTION

The present invention is directed to a method for making stable oil-in-water food dressing emulsions in which polyol fatty acid polyester fat substitutes replace, partially or fully, the triglyceride oils normally used in such dressings. In accordance with the method of this invention, a portion of the polyol fatty acid polyester is preemulsified to form a thickened aqueous gum solution before being combined, and further mixed or emulsified, with the other ingredients to form the desired mayonnaise, spoonable salad dressing, or pourable salad dressing. By preemulsifying at least a portion (i.e., at least 25 weight percent) of polyol fatty acid polyester, a stable oil-in-water emulsion with excellent flavor and mouthfeel properties can be obtained. Preferably at least 33 weight percent, and more preferably at least 40 weight percent, of the polyol fatty acid polyester is added as a preemulsified, thickened gum solution. Failure to add at least a portion of the polyol fatty acid polyester in an emulsion or preemulsion form will generally result in unstable dressings (i.e., one which will tend to invert to form oil-continuous emulsions or to separate into oil and water phases upon storage) or not even form the initial oil-in-water emulsion.

One object of the present invention is to provide a method for making a stable emulsified dressing containing a polyol fatty acid polyester, said method comprising:

(1) forming a preemulsion containing at least a portion of the polyol fatty acid polyester in an aqueous solution thickened with a thickening agent;

(2) combining the preemulsion with a mixture containing an egg yolk-containing material, an acidifying ingredient, and water; and (3) subjecting the combined preemulsion and mixture to shear to provide a stable emulsified dressing having mayonnaise-like properties.

Another object of the present invention is to provide a method for making a stable emulsified dressing containing a polyol fatty acid polyester and a starch, said method comprising:

(1) forming an emulsion containing an egg yolk-containing material and at least a portion of the polyol fatty acid polyester in an aqueous preemulsion thickened with a thickening agent;

(2) forming a starch base containing a starch, an acidifying ingredient, and water; and (3) combining about 40 to 90 weight percent of the emulsion and about 10 to 60 weight percent of the starch base to provide the stable emulsified dressing. These and other objects and advantages of the present invention will become apparent through the following detailed description, including the preferred embodiments, of the invention.

DETAILED DESCRIPTION OF THE INVENTION

In general, the present invention is directed to oil-in-water dressing products, including mayonnaise-type products, spoonable or viscous salad dressing products, and pourable salad dressing products, where the normal triglyceride oil is replaced partially or fully with polyol fatty acid polyesters. The mayonnaise-type products of this invention contain the ingredients normally associated with mayonnaise except that at least a portion of the triglyceride oil is replaced with a polyol fatty acid polyester. These formulations include a polyol fatty acid polyester, an egg yolk-containing material, a thickening agent, an acidifying ingredient, and water; a triglyceride oil and/or an emulsifying agent may also be present as optional ingredients. At least a portion of the polyol fatty acid polyester, a portion of the thickening agent, and a portion of the water (and at least a portion of the emulsifying agent if used) are incorporated as a preemulsified thickened gum solution. The polyol fatty acid polyester is generally present at a level of from about 12 to about 60 weight percent, preferably at a level of about 35 to 55 weight percent. The egg yolk-containing product is generally present at a level sufficient to provide from about 6 to about 10 weight percent egg yolk. The thickening agent, such as, for example, xanthan gum or other hydrocolloids, is generally present at about 0.1 to 2.0 weight percent. The acidifying material, such as, for example, vinegar, lime juice, or lemon juice is generally present at a level to provide a pH of from about 3 to about 4. The emulsifying agent is generally present at a level of about 0 to 0.3 weight percent. Triglyceride oil, if used, is generally present at a level of about 0 to 40 weight percent. The amount of water is adjusted to obtain the desired consistency and is generally at a level of about 20 to 50 weight percent. These formulations may also contain additional flavor ingredients (e.g., salt, sugar, and the like) normally used in mayonnaise-type products.

To prepare the mayonnaise-type products of the present invention, a portion of the water is added to a jacketed kettle which can be heated or supplied with chilled water. The water is thickened with a thickening agent (e.g., xanthan gum or other hydrocolloid). The polyol fatty acid polyester (optionally containing an emulsifying agent) is then added slowly to the water phase with agitation (e.g., using a low shear mixing device). This mixture is then emulsified using conventional techniques, thereby forming a preemulsified thickened gum solution of the polyol fatty acid polyester. Preferably the mixture is emulsified in a homogenizer operated at a pressure of at least 3000 psig to form a preemulsion containing about 45 to 65 weight percent of the polyol fatty acid polyester. This preemulsion can then be used as a triglyceride oil substitute in conventional mayonnaise-type products. Such dressing formulations, having a mayonnaise-like quality and oil levels in the range of from about 40 to about 60 weight percent, can be prepared without the use of a starch paste.

In another embodiment of the present invention, dressing formulations having characteristics from that of a pourable dressing to that of a salad dressing can be prepared utilizing a starch base. These formulations generally contain from about 12 to about 50 weight percent polyol fatty acid polyester. The polyol fatty acid polyester is incorporated into the dressing (i.e., starch base) using essentially the same preemulsified thickened gum solution as described above (i.e., an oil-in-water preemulsion containing about 40 to 65 weight percent polyol fatty acid polyester in a thickened gum solution). The aqueous starch base generally has from about 6 to about 12 weight percent of a suitable starch, such as potato starch, tapioca starch, corn starch, rice starch, and the like. The starch base may also include corn syrup solids having a DE of from about 25 to about 45 at a level of from about 3 to about 7 weight percent, salt at a level of from about 0.5 to about 2 weight percent, egg yolk at a level of about 6 to 10 weight percent, and sugar at a level of about 0 to 6 weight percent (preferably about 2 to 6 weight percent. An acidifying agent (e.g., vinegar, lime juice, lemon juice, and the like) is used in the starch base at a level sufficient to provide a pH of from about 3 to about 4. The balance of the starch base is water. The starch base is combined with the preemulsion at a level to provide about 50 to about 80 weight percent of the preemulsion and from about 20 to about 50 weight percent starch base.

The low calorie fat materials used as the fat component of the present invention can be any of a variety of edible, wholly or partially nondigestible polyol fatty acid polyesters. Preferred polyol fatty acid polyesters are sugar fatty acid polyesters, sugar alcohol fatty acid polyesters, polyglycerol fatty acid polyesters, and mixtures thereof. The polyol fatty acid polyesters useful in this invention also include tricarboxylic and tetracarboxylic acids and higher which are partially or wholly esterified with fatty alcohols. More preferably, the low calorie fat material is selected from the group consisting of sugar fatty acid polyesters, sugar alcohol fatty acid polyesters, and mixtures thereof, wherein the sugars and sugar alcohols contain from 4 to 8 hydroxyl groups prior to esterification. Even more preferably, the polyol fatty acid polyester is a sucrose fatty acid polyester.

Sugar or sugar alcohol fatty acid polyesters comprise sugars or sugar alcohols that are esterified with fatty acids. The term "sugar" is used herein in its conventional sense and includes monosaccharides and disaccharides. The term "sugar alcohol" is also used in its conventional sense and includes the reduction products of sugars wherein the aldehyde or ketone group has been reduced to an alcohol. The fatty acid ester compounds are prepared by reacting a monosaccharide, disaccharide, or sugar alcohol with fatty acids using conventional techniques.

Examples of suitable monosaccharides are those containing four hydroxyl groups such as xylose, arabinose and ribose; the sugar alcohol derived from xylose (i.e., xylitol) is also suitable. The monosaccharide erythrose is not suitable since it only contains three hydroxyl groups; however, the sugar alcohol derived from erythrose (i.e., erythritol) contains four hydroxyl groups and is thus suitable. Among five hydroxyl-containing monosaccharides that are suitable for use herein are glucose, mannose, galactose, fructose and sorbose. A sugar alcohol derived from sucrose, glucose, or sorbose (e.g., sorbitol) contains six hydroxyl groups and is also suitable as the alcohol moiety of the fatty acid ester compound. Examples of suitable disaccharides are maltose, lactose, and sucrose, all of which contain eight hydroxyl groups. Generally the sucrose fatty acid polyester are most preferred.

In preparing the polyol fatty acid polyesters of the present invention, a sugar or sugar alcohol compound such as those identified above are esterified with a mixture of fatty acids having from 2 to about 24 (preferably from about 8 to about 22) carbon atoms. Examples of such fatty acids are acetic, butyric, caprylic, capric, lauric, myristic, myristoleic, palmitic, palmitoleic, stearic, oleic, elaidic, ricinoleic, linoleic, linolenic, eleostearic, arachidic, behenic, and erucic. The fatty acids can be derived from suitable naturally occurring or synthetic fatty acids; they can be saturated or unsaturated and include positional and geometric isomers. The fat materials of this invention are preferably, but not necessarily, mixed esters of fatty acids, rather than esters of a single fatty acid.

Fatty acids per se or naturally occurring fats and oils can serve as the source for the fatty acid portion of the polyol fatty acid polyester. For example, rapeseed oil provides a good source for $C_{22}$ fatty acids; $C_{16}$–$C_{18}$ fatty acids can be provided by tallow, soybean oil or cottonseed oil. Shorter chain fatty acids (e.g., $C_{12}$–$C_{14}$ fatty acids) can be provided by coconut, palm kernel, or babassu oils. Corn oil, lard, olive oil, palm oil, peanut oil, safflower seed oil, sesame seed oil, and sunflower seed oil are examples of other natural oils which can serve as the source of the fatty acid component. The fatty acids can be saturated, unsaturated, or mixtures thereof. The unsaturated fatty acids can include positional and geometric isomers (e.g. cis and trans isomers) or mixtures thereof. Preferably, the fatty acid groups contain both saturated and unsaturated groups; preferably, the unsaturated fatty acid groups contain about 35 to 65 percent trans double bonds (relative to the total number of double bonds therein).

The preferred polyol fatty acid polyesters are the sucrose fatty acid polyesters. In order to provide the desired physical properties, the sucrose fatty acid polyesters are preferably esterified with particular kinds of fatty acids. Preferably, at least about 70 weight percent of the fatty acids are selected from the group consisting of lauric, myristic, palmitic, stearic, oleic, linoleic, behenic acids, and mixtures thereof.

The polyol fatty acid polyesters suitable for use herein can be prepared by a variety of methods well known to those skilled in the art. These methods include, for example, transesterification of the sugar or sugar alcohol with methyl, ethyl, or glycerol fatty acid esters using a variety of catalysts; acylation of the sugar or sugar alcohol with a fatty acid chloride; acylation of the sugar or sugar alcohol with a fatty acid anhydride; and acylation of the sugar or sugar alcohol with a fatty acid. For example, the preparation of polyol fatty acid polyesters is generally described in U.S. Pat. Nos. 2,831,854, 3,963,699, 4,517,360, and 4,518,772, and U.S. patent application Ser. No. 08/398,749, filed Mar. 6, 1995, entitled "Two-Stage Method for Preparing Polyol Fatty Acid Polyesters," all of which are incorporated by reference.

A characterizing feature of the polyol fatty acid polyesters useful as the fat component of the present invention is that they predominantly contain at least four fatty acid ester groups. Polyol fatty acid polyester compounds that contain three or less fatty acid ester groups are digested in the intestinal tract much in the manner as ordinary triglyceride fats, but polyol fatty acid polyester compounds that contain four or more fatty acid ester groups are digested to a lesser extent and thus have the desired low calorie properties.

Highly preferred low calorie fat materials for use in this invention are the sucrose fatty acid polyesters. Preferred sucrose fatty acid polyesters have the majority of their hydroxyl groups esterified with fatty acids. Preferably at least about 85 weight percent and most preferably at least about 95 weight percent of the sucrose fatty acid polyesters are selected from the group consisting of octaesters, heptaesters, hexaesters, and mixtures thereof. Preferably, no more than about 35 weight percent of the esters are hexaesters or heptaesters, and at least about 60 weight percent of the esters are octaesters. Most preferably, at least about 70 weight percent of the esters are octaesters. It is also most preferred that the polyesters have a total content of penta- and lower-esters of not more than about 3 weight percent.

The emulsified dressing prepared by the method of this invention may also contain triglyceride oils. In other words, the polyol fatty acid polyesters may only partially replace the normal triglycerides oils used in conventional mayonnaise or salad dressing products. Generally, however, it is preferred that the amount of triglyceride oils remaining in these formulations is less than about 40 weight percent and, more preferably, less than about 20 weight percent.

The following examples further illustrate various features of the invention and are not intended to limit the scope of the invention as set forth in the appended claims. Example 1 describes the preparation of the sucrose fatty acid polyesters (SPEs) used in the remaining examples; Example 1 does not constitute part of the present invention. Unless otherwise specified, all percentages are by weight.

EXAMPLE 1

Two sucrose fatty acid polyesters (SPEs) were prepared using a two-stage esterification reaction as described in U.S. patent application Ser. No. 08/398,749, filed Mar. 6, 1995. More specifically, the procedures described in Example 5 of that application were used to prepare a high melting point SPE (high m.p. SPE) and a low melting point SPE (low m.p. SPE). To prepare these SPEs, different blends of fatty acid methyl esters (FAMEs) derived from various hydrogenated triglycerides were used to achieve the desired fatty acid functionality.

Preparation of FAMEs. Suitable FAMEs were derived from a fully hydrogenated soybean oil and two partially hydrogenated soybean oils having the following fatty acid compositions:

|  | Fully Hyd. Oil | Partially Hyd. Oil #1 | Partially Hyd. Oil #2 |
| --- | --- | --- | --- |
| Palmitic | 11% | 10% | 10% |
| Stearic | 89% | 11% | 6% |
| Oleic | 0 | 64% | 73% |
| Linoleic | 0 | 15% | 11% |
| % Trans | — | 30–35% | 60–65% |

The "% trans" in the above table is the percentage of trans unsaturated fatty acid double bonds relative to the total number of double bonds.

The FAMEs were prepared by melting the respective oils (3000 g) in a 20-liter flask at 70° C. and then adding 1 percent by weight NaOH in methanol (450 g of solution), followed by an additional 1050 g methanol. The reaction mixture was refluxed for 4 hours at 68° C. with stirring, after which the basic catalyst was neutralized with phosphoric acid. The upper FAME layer was separated from the bottom methanol layer and then further treated in a rotary evaporation to remove residual methanol. The collected FAMEs were treated to an alkali extraction using a 15 percent aqueous NaOH solution to reduce the residual free fatty acid content to less than about 0.1 percent. The extracted FAMEs were further purified by distillation using a short path distillation apparatus. First Stage Reaction. Sucrose (30 g) and DMSO (250 g) were mixed in a rotary evaporator at 90° C. and 20 torr; after about 30 minutes, the sucrose was completely dissolved. A mixture of FAMEs (310 g), followed by powdered potassium carbonate (3 g), was added to the sucrose/DMSO solution. The FAME mixture was varied depending upon the SPE desired. For the high m.p. SPE, the FAME mixture contained about 50 percent FAMEs derived from the fully hydrogenated soybean oil, about 25 percent FAMEs derived from the partially hydrogenated soybean oil #1, and about 25 percent FAME derived from the partially hydrogenated soybean oil #2. For the low m.p. SPE, the FAMEs mixture contained about 50 percent FAMEs derived from the partially hydrogenated soybean oil #1 and about 50 percent FAMEs derived from the partially hydrogenated soybean oil #2. These two blends were reacted separately as described herein to prepare the two different SPEs.

The reaction was continued for about 5 hours at 90° C. under reduced pressure suitable to maintain the DMSO under continuous reflux. The reaction mixture was then transferred to a separatory funnel where the layers were allowed to separate for about 16 hours at 50° C. The DMSO layer was separated and discarded. The top layer was filtered to remove residual catalyst and distilled at 70° C. and 0.2 torr to remove residual DMSO. The resulting top layer consisted mainly of partially-esterified sucrose fatty acid polyesters and unreacted FAMEs.

Second Stage Reaction. About 300 g of the top layer from the stage one reaction (consisting mainly of partially-esterified sucrose fatty acid polyesters and unreacted FAMEs) was placed in a 1000 ml round bottom flask. The top layer contained about a 2.3 fold molar excess of FAMEs, relative to the available hydroxyl groups in the partially-esterified sucrose fatty acid polyester. Thus, additional FAMEs were not required in this second stage reaction. The reaction system was equipped with a nitrogen sparge to remove by-products and a 250 mm Vigreux column operated under reflux conditions. The reaction mixture was heated to 130° C. under 5 torr pressure before the addition of a potassium carbonate catalyst. The catalyst was added as an aqueous solution (about 20 ml of a 20 percent potassium carbonate solution) through a thin-bore tube directly into the hot reaction mixture. The reaction was continued for 24 hours.

After completion of the reaction, the catalyst was removed by filtration and the residual FAMEs were reduced to below about 0.1 percent by molecular distillation. The resulting high m.p. fully-esterified sucrose fatty acid polyester was analyzed by mass spectrometry and found to consist of about 87 percent octaester, 13 percent heptaester, less than 1 percent hexaester, and no detectable lower esters. The resulting low m.p. fully-esterified sucrose fatty acid polyester was analyzed by mass spectrometry and found to consist of about 87 percent octaester, 11 percent heptaester, 2 percent hexaester, and no detectable lower esters. The solid fat contents of the two SPEs are as follows:

| Temp. (°C.) | High M.P. SPE | Low M.P. SPE |
| --- | --- | --- |
| 10 | 76.6% | 14.1% |
| 21 | 68.8 | <1 |
| 27 | 53.9 | <1 |
| 33 | 37.6 | <1 |
| 37 | 19.3 | <1 |
| 41 | 13.6 | <1 |
| 60 | <1 | <1 |

The low m.p. SPE was liquid at room temperature. The high m.p. SPE had a dropping point of 44° C. Blends of the low m.p. and high m.p. SPEs containing at least 40 weight percent of the high m.p. SPE had a dropping point above 40° C; such blends should be physiologically stable (i.e., not cause anal leakage) when consumed. The high m.p. and low m.p. SPEs were used in Examples 2–5 to prepare emulsified dressings in accordance with the method of this invention.

EXAMPLE 2

This example illustrates the method of this invention in preparing a mayonnaise-type product using a 1:1 blend of the high m.p. and the low m.p. sucrose fatty acid polyesters of Example 1. A preemulsion or dispersion of the SPEs was first formed by homogenizing melted SPEs containing a small amount of an emulsifier (i.e., polysorbate 60) into an aqueous xanthan gum solution. The preemulsion of sucrose fatty acid polyesters was then used to replace the oil phase in a typical mayonnaise formulation. Several control samples were also prepared. One control sample (Control #1) was also made by a similar process except that soybean oil was used rather than sucrose fatty acid polyesters; this sample should be similar to a conventional mayonnaise product. Another control sample (Control #2) was prepared by using a sucrose fatty acid polyester blend to replace the preemulsified oil phase in a similar formulation.

Preparation of Preemulsion. A preemulsion was prepared containing the following ingredients:

| Percentage | Ingredient |
| --- | --- |
| 49.67 | Water |
| 25.0 | High m.p. SPE |
| 25.0 | Low m.p. SPE |
| 0.2 | Polysorbate 60 |
| 0.13 | Xanthan gum |

The xanthan gum was dispersed in water and allowed to hydrate at 45° C. under agitation. The lipid ingredients (high m.p. SPE, low m.p. SPE, and Polysorbate 60) were melted together at 45° C. and slowly combined with the xanthan solution while being mixed in a Polytron homogenizer. An oil-in-water preemulsion containing about 50 percent sucrose fatty acid polyesters was obtained.

Preparation of Egg Spice Mix. An egg spice mixture was prepared containing the following ingredients:

| Percentage | Ingredient |
| --- | --- |
| 50.9 | Whole egg |
| 10.3 | Egg yolk |
| 32.7 | Water |
| 6.1 | Flavors and spices |

All ingredients in the egg spice mixture were simply combined and mixed at 45° C.

Preparation of Mayonnaise. A finished mayonnaise was prepared with the following ingredients:

| Percentage | Ingredient |
| --- | --- |
| 80.0 | Preemulsion |
| 16.7 | Egg Spice Mix |
| 2.7 | Vinegar |
| 0.6 | Xanthan gum |

The preemulsion was slowly added to the egg spice mixture while the latter was stirred at 45° C. Vinegar was added once all of the preemulsion had been incorporated. Xanthan was then blended in and mixed until smooth.

Control #1 made with soybean oil was a stable emulsion; it was smooth and creamy but somewhat oily. The largest oil droplets in Control #1 were about 8 microns in diameter, with the majority 4 microns or less. Control #1 had good flavor, smooth texture, but a rather soft body relative to a conventional mayonnaise. The inventive product prepared with preemulsified SPEs was just as smooth and creamy as Control #1, but with less oily character. The inventive product had a somewhat weaker flavor and a softer body than Control #1. The oil droplets (majority about 10 microns in diameter) of the inventive product appeared to be larger than those in Control #1; some of the droplets in the inventive product appeared irregular in shape. The total amount of SPEs in the inventive product was 40 percent. The inventive product was stable for at least two months at room temperature. Control #2, prepared without first preemulsifying the SPEs, failed to form an oil-in-water emulsion.

EXAMPLE 3

This example also illustrate the formation of a mayonnaise containing sucrose fatty acid polyesters. A preemulsion was first formed from a high m.p. blend of the two SPEs of Example 1 using a process analogous to that described in Example 2. A second emulsion was made from a low m.p. blend of the two SPEs of Example 1 in a mayonnaise formula containing double the typical amount of egg and egg yolk. The two emulsions were then combined and thickened with a pregelatinized starch. The preemulsion provides solid SPE to prevent anal leakage, while the second emulsion provides a liquid SPE to improve the oily, mouth-warming perception of the formulation.

Preparation of Preemulsion. A preemulsion was prepared containing the following ingredients:

| Percentage | Ingredient |
| --- | --- |
| 39.3 | Water |
| 29.8 | High m.p. SPE |
| 13.04 | Whole egg |
| 9.94 | Low m.p. SPE |
| 2.64 | Egg yolk |
| 4.2 | Vinegar |
| 0.88 | Xanthan gum |
| 0.2 | Polysorbate 60 |

A portion of the xanthan gum (0.13%) was hydrated in water at 45° C. The SPEs and Polysorbate 60 were then blended into the aqueous gum solution using a Polytron homogenizer, followed by the whole egg and egg yolk. The vinegar and the remainder of xanthan (0.75%) were then added. Mixing in the Polytron homogenizer was continued until a smooth oil-in-water emulsion was obtained.

Preparation of Second Emulsion. The second emulsion contained the follow ingredients:

| Percentage | Ingredient |
| --- | --- |
| 48.97 | Low m.p. SPE |
| 16.32 | High m.p. SPE |
| 15.19 | Whole egg |
| 9.76 | Water |
| 3.07 | Egg yolk |
| 4.88 | Vinegar |
| 1.81 | Flavors and spices |

All ingredients, except the SPEs and vinegar, were mixed at 45° C. The SPEs were then slowly stirred into the egg/spice mixture. Vinegar was then added. The mixture was then emulsified using a Polytron homogenizer.

Preparation of Mayonnaise. The finished mayonnaise was prepared with the following ingredients:

| Percentage | Ingredient |
| --- | --- |
| 56.5 | Preemulsion |
| 43.0 | Second emulsion |
| 0.5 | Pregelatinized starch |

The preemulsion and the second emulsion were blended together at 45° C. Starch was slowly added to the combined product and mixed until smooth.

The resulting mayonnaise product was smooth and creamy with no waxy residue. It had good flavor release and a warming, oily mouthfeel. It also had good body, with a texture indistinguishable from that of conventional mayonnaise. The total amount of SPE in this product was 50.5 percent. About 45 percent of the SPE was added as the preemulsion. The microstructure of the product revealed two populations of SPE droplets, apparently resulting from the two emulsions used. The larger droplets were 12–15 microns in diameter and generally contained the sold, more crystalline fraction of SPE (i.e., high melting point material). The smaller droplets were less than 5 microns in diameter and generally contained the low m.p. SPEs. The starch granules were uniformly dispersed throughout the emulsion phase. The product was stable for at least two months at room temperature.

EXAMPLE 4

This example illustrates the preparation of a spoonable or viscous salad dressing using sucrose fatty acid polyesters and a starch base. The preemulsion and the second emulsion from Example 3 were combined with a starch base to form the salad dressing product.

Preparation of Starch Base. A starch base was prepared containing the following ingredients:

| Percentage | Ingredient |
| --- | --- |
| 84.0 | Water |
| 10.5 | Modified Waxy Maize Starch |
| 4.0 | Vinegar |
| 1.5 | Flavors and spices |

The mixture was heated in a steam-jacketed kettle to about 189° F with mild agitation. The gelatinized starch base was then cooled to about 110° F. before storing.

Preparation of Salad Dressing. A salad dressing was prepared containing the following ingredients:

| Percentage | Ingredient |
| --- | --- |
| 39.8 | Preemulsion from Ex. 3 |
| 30.2 | Second emulsion from Ex. 3 |
| 30.0 | Starch Base |

The ingredients were combined at room temperature with mild agitation to form a viscous salad dressing containing 35 weight percent sucrose fatty acid polyesters. The finished product had excellent appearance, texture, and flavor characteristics. The starch base gave the product a higher yield (cut) typical of a conventional salad dressing product but less creamy than conventional mayonnaise. The firmness was typical of a mayonnaise or salad dressing product. The flavor was weaker than that of the mayonnaise product of Example 3 due to dilution with the starch base. The microstructure of this salad dressing product showed well dispersed starch granules in a closely packed emulsion phase. Although the product was made with two different SPE-containing emulsions, it was difficult to distinguish the SPE droplets from the different emulsions. All of the emulsified droplets were less than about 8 microns in diameter. The product was stable for at least two months at room temperature.

EXAMPLE 5

This example illustrates the preparation of a pourable salad dressing using the method of this invention. The pourable salad dressing contains the high m.p. SPE composition for physiological stability and the low m.p. SPE composition for oiliness and mouthwarming. Instead of thickening the combined emulsion with starch, it was blended with a buttermilk/spice blend typical of Ranch dressings.

Preparation of Preemulsion. A preemulsion containing the SPEs of Example 1 and using the same procedure as used for the preemulsion of Example 3 was prepared from the following ingredients:

| Percentage | Ingredient |
| --- | --- |
| 39.76 | Water |
| 30.0 | High m.p. SPE |
| 12.96 | Whole egg |
| 10.0 | Low m.p. SPE |
| 2.4 | Egg yolk |
| 4.0 | Vinegar |
| 0.72 | Xanthan gum |
| 0.16 | Polysorbate 60 |

Preparation of Second Emulsion. A second emulsion was prepared using the same procedure as the second emulsion in Example 3 with the following ingredients:

| Percentage | Ingredient |
| --- | --- |
| 48.0 | Low m.p. SPE |
| 16.0 | High m.p. SPE |
| 15.0 | Whole egg |
| 10.3 | Water |
| 3.0 | Egg yolk |
| 5.0 | Vinegar |
| 2.7 | Flavors and spices |

Preparation of Spice Mixture. The spice mixture was prepared by mixing the following ingredients at room temperature:

| Percentage | Ingredient |
| --- | --- |
| 60.7 | Buttermilk |
| 39.3 | Flavors and spices |

Preparation of Pourable Salad Dressing. A pourable, ranch-type salad dressing was prepared containing the following ingredients:

| Percentage | Ingredient |
| --- | --- |
| 40.6 | Preemulsion |
| 34.4 | Second Emulsion |
| 25.0 | Spice Mixture |

The ingredients were combined at room temperature with gentle stirring. The finished product was a highly acceptable Ranch-type salad dressing, containing about 38 weight percent SPE, with excellent texture and flavor characteristics.

We claim:

1. A method for making a stable emulsified dressing containing a polyol fatty acid polyester, said method comprising:
    (1) forming a preemulsion containing at least a portion of the polyol fatty acid polyester in an aqueous solution thickened with a thickening agent;
    (2) combining the preemulsion with a mixture containing an egg yolk-containing material, an acidifying ingredient, and water; and
    (3) subjecting the combined preemulsion and mixture to shear to provide a stable emulsified dressing having mayonnaise-like properties.

2. A method as defined in claim 1, wherein the thickening agent is selected from the group consisting of xanthan and hydrocolloids.

3. A method as defined in claim 1, wherein the stable emulsified dressing contains about 40 to 60 weight percent polyol fatty acid polyester, about 6 to 10 weight percent egg yolk-containing material, about 0.1 to 2.0 weight percent of the thickening agent, and sufficient acidifying material to provide a pH of about 3 to 4.

4. A method as defined in claim 3, wherein the acidifying material is vinegar, lime juice, or lemon juice.

5. A method as defined in claim 1, wherein the mixture of step (2) is emulsified before being combined with the preemulsion.

6. A method as defined in claim 3, wherein the stable emulsified dressing further contains 0 to about 40 weight percent of a triglyceride oil and 0 to about 0.3 weight percent of an emulsifying agent.

7. A method as defined in claim 1, wherein the thickening agent is xanthan which is present at about 0.1 to 1 weight percent.

8. A method as defined in claim 1, wherein the polyol fatty acid polyester is a sucrose fatty acid polyester.

9. A method as defined in claim 3, wherein the polyol fatty acid polyester is a sucrose fatty acid polyester.

10. A method as defined in claim 8, wherein the polyol fatty acid polyester is a blend of a first sucrose fatty acid polyester which is solid at body temperature and a second sucrose fatty acid polyester which is liquid at body temperature.

11. A method as defined in claim 9, wherein the polyol fatty acid polyester is a blend of a first sucrose fatty acid polyester which is solid at body temperature and a second sucrose fatty acid polyester which is liquid at body temperature.

12. A method as defined in claim 1, wherein the stable emulsified dressing is combined with flavoring ingredients to form a pourable dressing.

13. A method for making a stable emulsified dressing containing a polyol fatty acid polyester and a starch, said method comprising:
   (1) forming an emulsion containing an egg yolk-containing material and at least a portion of the polyol fatty acid polyester in an aqueous preemulsion thickened with a thickening agent;
   (2) forming a starch base containing a starch, an acidifying ingredient, and water; and
   (3) combining about 40 to 90 weight percent of the emulsion and about 10 to 60 weight percent of the starch base to provide the stable emulsified dressing.

14. A method as defined in claim 13, wherein stable emulsified dressing is a salad dressing.

15. A method as defined in claim 13, wherein the stable emulsified dressing contains about 12 to 50 weight percent polyol fatty acid polyester, about 4 to 10 weight percent egg yolk-containing material, about 0.1 to 1 weight percent of the thickening agent, about 0.5 to 5 weight percent of starch, about 0 to 6 weight percent sugar, and sufficient acidifying material to provide a pH of about 3 to 4 in the stable emulsified dressing.

16. A method as defined in claim 15, wherein the acidifying material is selected from the group consisting of vinegar, lime juice, and lemon juice and the starch is selected from the group consisting of potato starch, tapioca starch, corn starch, and rice starch.

17. A method as defined in claim 16, wherein the stable emulsified dressing also contains about 3 to 7 weight percent corn syrup solids having a DE of about 25 to 45.

18. A method as defined in claim 13, wherein the polyol fatty acid polyester is a sucrose fatty acid polyester.

19. A method as defined in claim 14, wherein the polyol fatty acid polyester is a sucrose fatty acid polyester.

20. A method as defined in claim 15, wherein the polyol fatty acid polyester is a sucrose fatty acid polyester.

21. A method as defined in claim 16, wherein the polyol fatty acid polyester is a sucrose fatty acid polyester.

22. A method as defined in claim 18, wherein the polyol fatty acid polyester is a blend of a first sucrose fatty acid polyester which is solid at body temperature and a second sucrose fatty acid polyester which is liquid at body temperature.

23. A method as defined in claim 21, wherein the polyol fatty acid polyester is a blend of a first sucrose fatty acid polyester which is solid at body temperature and a second sucrose fatty acid polyester which is liquid at body temperature.

* * * * *